United States Patent [19]
Cherniak

[11] Patent Number: 5,318,339
[45] Date of Patent: Jun. 7, 1994

[54] VEHICULAR PORTABLE SWIVEL SEAT

[76] Inventor: Trexie I. Cherniak, 1810 S.W. 81st Ave. Apt. #2116, North Lauderdale, Fla. 33068

[21] Appl. No.: 836,702

[22] Filed: Feb. 18, 1992

[51] Int. Cl.[5] .................................................. A47C 1/08
[52] U.S. Cl. .................................. 297/344.26; 297/242; 297/250.1
[58] Field of Search ...................... 297/349, 250, 242

[56] References Cited

U.S. PATENT DOCUMENTS

| | | | |
|---|---|---|---|
| 1,501,005 | 7/1924 | Larsen | 297/250 |
| 2,465,026 | 3/1949 | Hartz | 297/349 X |
| 2,587,679 | 3/1952 | Atkinson | 297/349 X |
| 3,253,856 | 5/1966 | Ueda | 297/349 X |
| 3,718,365 | 2/1973 | Gibson | 297/349 |
| 3,789,444 | 2/1974 | McCord | 297/249 X |
| 4,854,638 | 8/1989 | Marcus et al. | 297/250 |
| 4,874,203 | 10/1989 | Henley | 297/250 |
| 4,971,392 | 11/1990 | Young | 297/349 X |
| 5,183,312 | 2/1993 | Nania | 297/349 X |

*Primary Examiner*—Philip C. Kannan
*Attorney, Agent, or Firm*—Malin, Haley DiMaggio & Crosby

[57] ABSTRACT

A portable apparatus for expeditiously seating a handicapped or elderly person in a vehicle. The device is mounted on a car seat and includes top and bottom members which swivel relative to each other. The bottom member is removably fastened by a belt to the existing car seat.

1 Claim, 2 Drawing Sheets

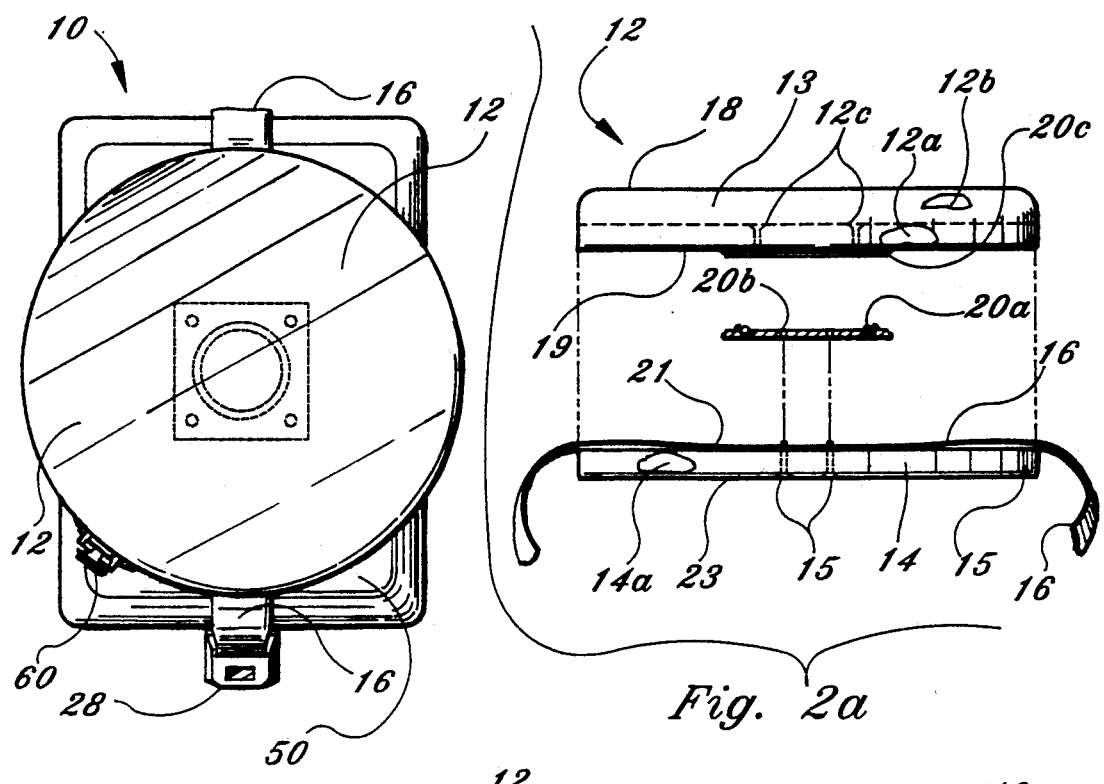
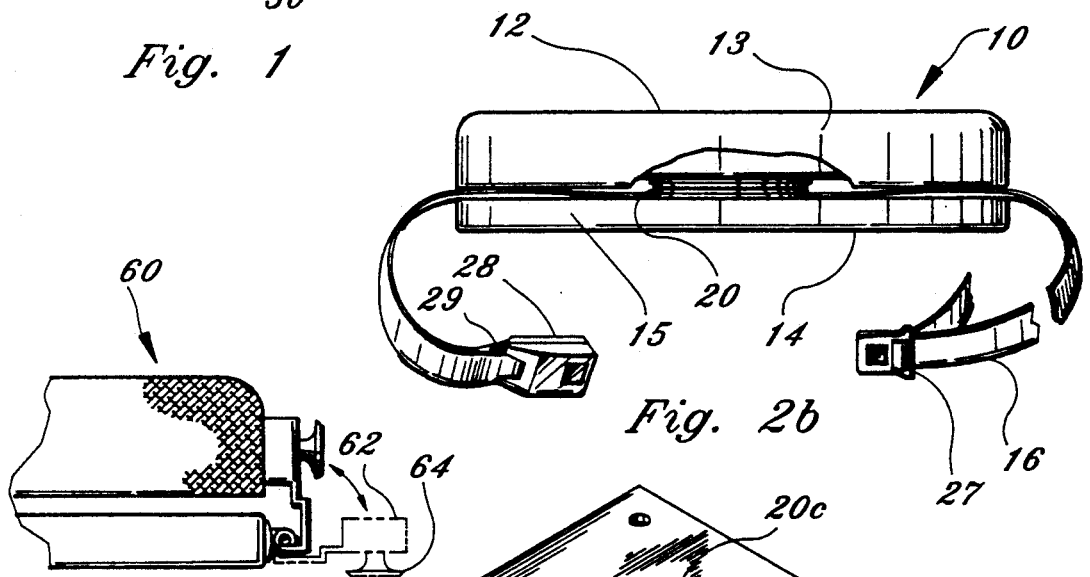
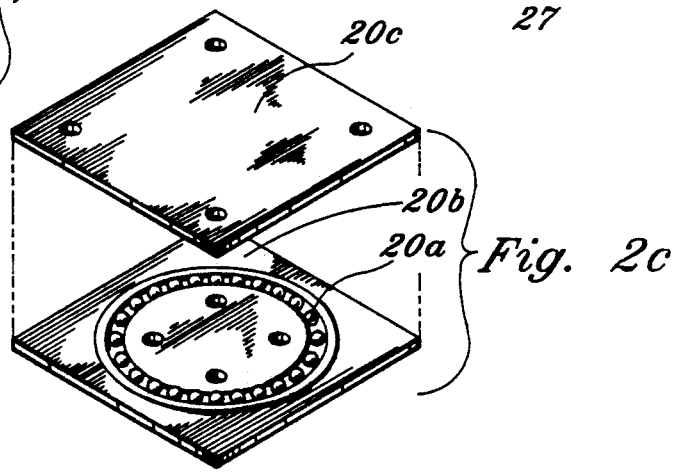

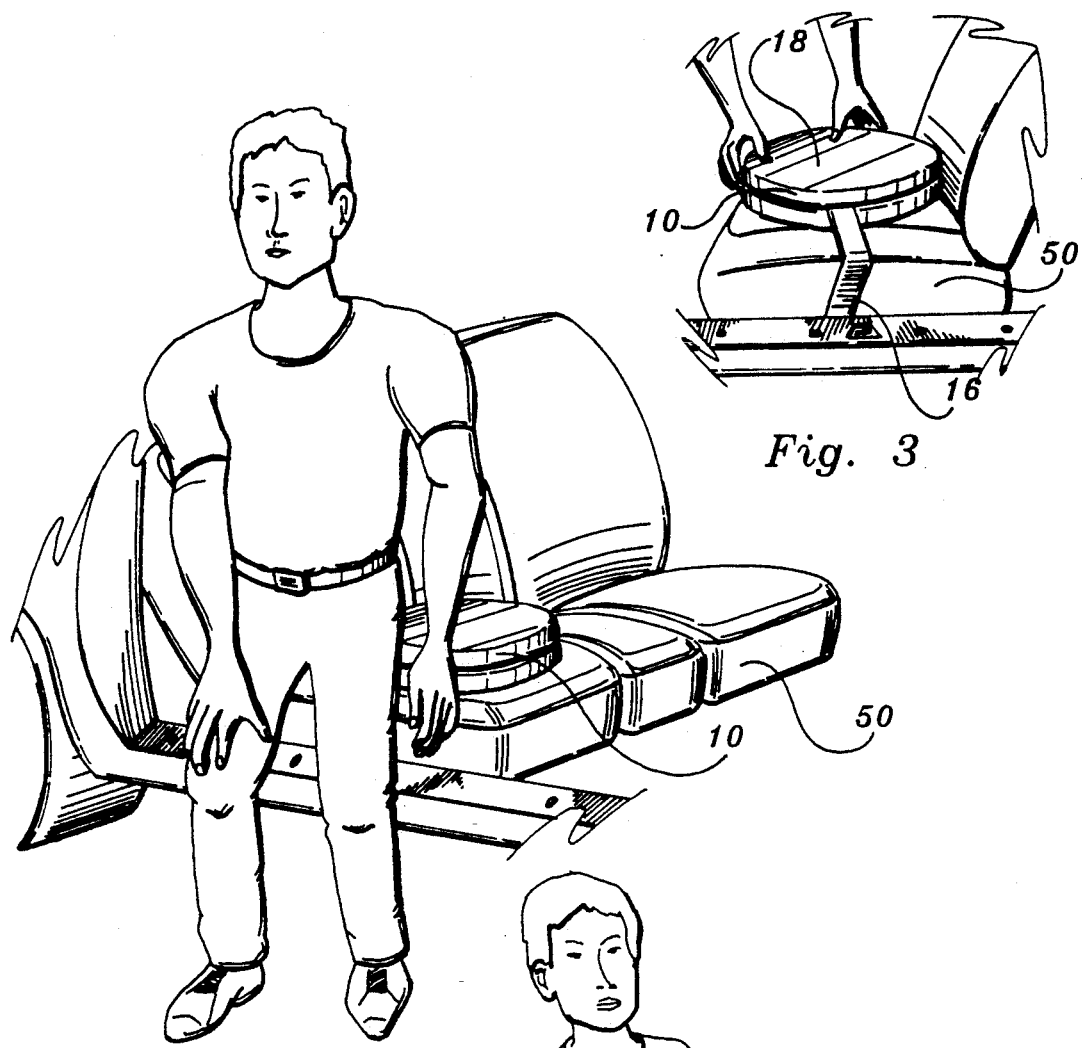
Fig. 3
Fig. 4
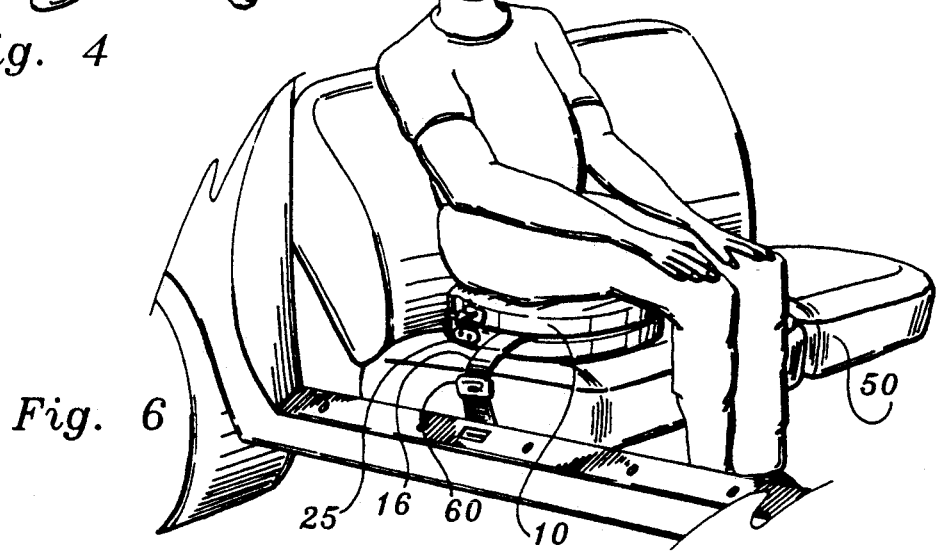
Fig. 6

VEHICULAR PORTABLE SWIVEL SEAT

FIELD OF THE INVENTION

The present invention relates generally to vehicle seats, such as automobiles, cars, buses, trucks and the like and, more particularly, to a vehicular portable seat which allows for easy and safe seating of elderly or handicapped persons, for easy and safe alignment from the vehicle.

DESCRIPTION OF THE PRIOR ART

Size constrictions of a vehicle such as an automobile often make entering and exiting an automobile a difficult and unpleasant endeavor. Present emphasis on fuel economy require smaller vehicles, thus, limiting passenger and driver entering exiting area, as well as the overall size of the automobile. Further size reduction only enhances the difficult of entering and exiting an automobile. While fuel concerns are not a momentary worry, the continued downsizing of automobiles is inevitable.

The problems discussed above are greatly multiplied when a handicapped or elderly person attempts to enter or exit an automobile. Often the person's disability will directly affect his or her ability to enter or exit such automobile. Prior art attempts to remedy this problem include U.S. Pat. No. 4,846,529 to Tulley. Tulley discloses a passenger seat in a vehicle and adapted to assist passengers in entering and leaving the vehicle. Tulley's device includes a motorized control which permits the seat to be moved forward or backward, up or down, and to rotate on its vertical axis approximately 90 degrees, as well, to tilt from back to front. The seat can be adjusted to fit the requirements of the person, and selectively rotate until the seat faces the door of the vehicle, extend outwardly toward the door opening, and then, tilt to assist the person in being seated or unseated. A disadvantage to Tulley's device is that it requires the permanent replacement of the passenger seat. Thus, Tulley can only be of assistance to a handicap person in a single automobile. Applicant has overcome the problems of Tulley by providing a conventional, portable car seat which can be used with an existing car seat, either bucket or full length.

SUMMARY OF THE INVENTION

The portable swivel car seat of the instant invention is provided for ease of entering and exiting a vehicle. The invention includes a rigid base member that engages and rests on the top surface of a conventional vehicle seat and a top member having a rigid lower surface construction and a soft or padded upper surface construction to provide comfort and support to the user when he or she sits on the car seat, all of which swivels relative to the base member. Top and base members are operatively connected together by a rotating or swivel member that includes two rigid bearing plates and ball bearings. A seat holding strap is attached to the base member for removably fastening the portable car seat to the existing car seat. A swivel lock is included to lock the top member in place relative to the base member.

Upon fastening the portable car seat of the instant invention to a conventional automobile seat, the swivel seat is available for an elderly or handicapped person, permitting simple egress from and entry into the automobile. For example, a handicapped person desirous of entry into the automobile is able to sit on the portable swivel car seat and then, by rotation of the upper member, place their legs into the automobile foot well. The portable swivel car seat effectively eliminates rotational friction between the person and the conventional automobile seat. The swivel member allows the top member of the portable car seat to freely rotate. Once the handicapped person is positioned within the automobile, the swivel member is locked in place by a friction device to prevent rotation. To exit the automobile, the handicapped person releases the friction locking device, thus allowing the top member of the car seat to again freely rotate. The user rotates the seat, which allows the user's legs to be moved outside the automobile.

The beneficial aspect of this device is dependent upon the mobility of the user and is not limited to the individual who sits upon the seat. This is best illustrated by the helper who is desirous of transporting an elderly or handicapped person who has limited leg strength. Once the individual is placed on the seat, the helper need only pick up the individual's legs and place them into the vehicle, placement causing the top member to rotate. Thus, the helper need only lift and turn the individual's legs without the need of overcoming seat friction. Once the individual is positioned in the automobile, the swivel member is locked in place by the friction locking member. When handicapped exiting is desired, the helper need only enable the swivel member and lift the individual's legs to a position outside the automobile. The top member of the portable car seat rotating in the direction of the individual's legs. The swivel member can again by disabled to assist in the final exit.

Accordingly, the primary object of the instant invention is to provide a portable, independent, and easily transferable apparatus or device for simplifying entering or exiting a vehicle.

Another object of the instant invention is to provide an apparatus or device for simplifying entering or exiting a vehicle for a handicapped person which does not require modification of the vehicle.

Yet another object of the instant invention is to provide a portable, swivel seat apparatus or device for elderly or handicapped for simplifying entering or exiting a vehicle which is easy to use and relatively low in cost to manufacture.

Still another object of the instant invention is to provide an apparatus or device for simplifying entering or exiting a vehicle which requires no electrical connections.

A further object of the instant invention is to provide an apparatus or device for simplifying entering or exiting a vehicle which is lockable in multiple positions.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which:

FIG. 1 is a top view of the instant invention;
FIG. 2A is an exploded side view of FIG. 1;
FIG. 2B is a side view of FIG. 1;

FIG. 2C is a perspective, exploded view of the swivel mechanism;

FIG. 3 is a perspective view showing the instant invention fastened to the existing car seat;

FIG. 4 is a perspective view showing the user and the instant invention prior to the user entering the automobile.

FIG. 5 is a cut away view showing the locking member in accordance with the instant invention; and FIG. 6 is a perspective view showing the instant invention to the existing car seat and the user positioned within the automobile.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring now to FIGS. 1, 2A and 2B, the present invention is generally shown as a portable swivel car seat at 10. Portable seat 10 includes a top member 12 and base member 14, operatively associated with each other via a rotating member 20, which will be described in detail below. Top member 12 generally includes a top rigid material such a wood or metal (12a), a piece of foam for padding and cushioning (12b), and a top fabric or vinyl cover member 13. The piece of foam 12b is placed on top of the top rigid material 12a or attached to the top of the top rigid material 12a and is further secured on top of the top rigid material by the attachment of top cover member 13 to the top rigid material. Screws 12C attach top member 12 to bearing plate 20c, which is connected together with bearing plate 20b with several ball bearings 20a disposed in between the plates 20b and 20c to permit swivel or relative rotation of the plates. Plate 20b is attached to bottom member 15 by screws 15a. Top cover member 13 encompasses the foam material 12b and is attached to the top rigid material 12a via any suitable means, such as tacking, stapling, hinging, gluing, taping, sewing, elastic, VELCRO hooks and loops, snaps, drawstrings or the like. Top cover member 13 can be made from one of a numerous amount of materials, such as fabric, leather, denim, polyurethene or the like. Top member 12 includes top and bottom surfaces 18 and 19, respectively. Preferably, top member 12 is substantially circular in shape.

Base member 14 includes a bottom rigid material 14a such as wood, plastic or metal, preferably enclosed within a cover member 15. Bottom cover member 15 can be attached to the rigid material by any suitable fashion similar to the attachment of top cover member 13 to the top rigid material. Base member 14 includes top and bottom surfaces 21 and 23, respectively. Preferably, bottom member 14 is rectangular in shape.

Rotating member operates much like a "lazy susan" and is generally shown at 20 and in the preferred embodiment is a ball-bearing plate having a top plate-like member 22, bottom plate-like member 24 and a plurality of ball-bearings (not shown) located within. However, it is to be understood other non-frictional devices can be substituted for the ball-bearing plate and are within the scope and spirit of the present invention. Top plate-like member 22 is attached to bottom surface 19 of top member 12 by a plurality of rivets, by welding or the like. Bottom plate-like member 24 is attached to top surface 21 of bottom member 14 by a plurality of rivets, by welding or the like.

Before bottom plate-like member 24 is attached to bottom member 14 a strap or belt member 16 is positioned on top surface 21 of bottom member 14. Strap 16 is positioned or laid on bottom member 14 so as to be intermediate the plurality of rivets when attaching bottom plate-like member 24 to bottom member 14 (See FIG. 1). Thus, strap 16 is firmly and permanently held between bottom member 14 and bottom plate-like member 24 and retains its position on top surface 21 without attachment. Strap 16 contains conventional male/female fasteners for connecting the ends of strap 16 together. In the preferred embodiment, as seen in FIG. 2b, the connecting means includes a belt buckle 28 retained within a belt loop 29 on one end of strap 16 and a plurality of apertures 27 located at the other end of strap 16. In this embodiment, the belt fasteners function similar to a conventional car seat safety buckle and fastener. Other embodiments for the fasteners can be utilized and are within the scope and spirit of the present invention. Such alternatives include other buckle means, fabric hook and loop fasteners, or the like.

Portable seat 10 can be fastened by strap 16 to bucket seats (side to side and under) or full length car seats (front to back and under the seat). FIGS. 3 and 6 show portable seat 10 removably fastened to an existing car seat 50. Car seat 50 in FIGS. 3 and 6 is of the bucket type. Strap 16 extends over the sides of and underneath seat 50. Once strap 16 has been brought underneath seat 50, it is tightened around seat 50 to securely hold portable seat 10 in place. Once tightened, the ends of strap 16 are connected by the buckle fasteners as discussed above. For use with full length car seats, strap 16 extends over the front and back of and underneath the car seat and is tightened and connected in a similar fashion as for bucket seat 50.

A swivel friction locking device is generally shown at 60 in FIG. 5 in both its locked and unlocked positions. Locking device 60 is attached directed to bottom member 14 and includes a two-position, hinged friction arm. In the preferred embodiment, locking member 60 is a spring loaded friction pressure lock or clamp having a friction surface 62 and handle 64. In the vertical locked position, friction surface 62 is pressed up by the user grabbing handle 64, against top member 12 causing a frictional force on top member 12 which prevents top member 12 from rotating under spring tension. Seat 10 is used in the locked position when the user is seated and positioned on seat 10 to prevent the user from rotating or turning while the vehicle is moving.

In operation, upon fastening the portable car seat 10 to a conventional automobile seat 50, portable car seat 10 is available for the elderly and handicapped permitting simple egress from and entry into the automobile. For instance, an elderly person desirous of entry into the automobile is able to sit on portable car seat 10 and then place their legs into the automobile in the usual manner. Portable car set 10 effectively eliminates all friction between the person and conventional automobile seat 50. Rotating member 20 allows top member 12 of portable car seat 10 to freely rotate. Once the elderly person is positioned within the automobile, the rotating member 20 i disabled by locking device 60. To exit the automobile, the elderly person enables rotating member 20 by disabling locking device 60 thus allowing top member 12 of portable car seat 10 to again freely rotate. When the user places their legs outside the automobile portable car seat 10 allows friction less rotation of the user permitting an effortless exit.

The beneficial aspect of this device is dependent upon the mobility of the user and is not limited to the individual who sits upon portable car seat 10. This is best illustrated by the helper who is desirous of transporting an elderly or handicapped person who has limited leg strength. Once the individual is placed on portable car seat 10, the helper need only pick up the individual'legs and place them into the vehicle, placement causing top member 12 to rotate. Thus, the helper need only lift and turn the individualp's legs without the need of overcoming seat 50 friction. Once the individual impositions in the automobile, rotating member 20 is disabled by locking member 60. When exiting is desired, the helper need only enable rotating member 20 and lift the individual's legs to a position outside the automobile. Top member 12 of portable car seat 10 rotating in the direction of the individual's legs. Rotating member 20 can again by disabled to assist in the final exit. The device can be used with virtually every make or model automobile and small truck on the passenger side.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim as new and desire to secure by letters patent of the United States is:

1. An apparatus for providing a vehicular portable swivel seat for aiding a person, especially of limited ambulatory ability, in entering or exiting an automotive vehicle, said apparatus being removably fastened to and on top of a single existing automotive vehicular seat, said apparatus comprising:

a thin, rigid, circular top member having a flat top surface and a flat bottom surface, said top member having a circumferential peripheral edge, said top member circumferential peripheral edge allowing said top member to be completely accessible from any radial direction, said top member sized in diameter to span said single car seat;

a resilient pad mounted on top of said top member top surface, said pad extending across said top member top surface to said top member's circumferential peripheral edge;

a cover mounted over said pad and connected around the top of said top member and encompassing the complete circumference of said top member;

a thin, rigid, circular bottom member having the same diameter as said top member, said bottom member having a flat top surface and a flat bottom surface;

a bottom cover mounted over said bottom surface of said bottom member and attached to the top surface of said bottom member, enclosing said bottom member completely to provide a contact cover with said automotive vehicular seat;

a swivel for allowing relative rotational movement between said rigid top member and said rigid bottom member, said swivel connected to the bottom surface of said top member and the top surface of said bottom member and centrally located relative to said top member and said bottom member, said swivel including a top plate connected to the bottom surface of said top member, a bottom plate connected to the top surface of said bottom member, and a plurality of ball bearings disposed between said top plate and said bottom plate, said top late attached to said bottom plate and operably connected with said ball bearings associated therewith to permit ease of rotational movement between said top member and said bottom member;

a disengageable lock connected to said bottom member and connectable to said top member, said lock having a first mode of operation to prevent rotational movement between said top member and said bottom member and a second mode of operation which allows relative movement between said top member and said bottom member, said lock including a hinge connected to said bottom member and a hinge member connected to said hinge that can be pivoted vertically and a hinge plate connected to said top member which receives and locks said hinge late in said first mode of operation; and a strap connected firmly to the top surface of said bottom member, said strap being sized to fit around a conventional automobile seat either from front to back for an extended vehicular front seat or from said to side for bucket seats found in a conventional automobile, said strap including a buckle attached to one end to allow the strap to be secured to said automotive seat, attaching said bottom member to said automobile seat, said bottom member being sized n diameter to fit on top of an automobile seat without extreme overlap, whereby a partially ambulatory person can be allowed to sit upon the apparatus when entering the car to provide a swivel action to rotate the person from a seated position into the car to an exit position.

* * * * *